(12) United States Patent
Liu et al.

(10) Patent No.: US 11,686,223 B1
(45) Date of Patent: Jun. 27, 2023

(54) CAPTURING AND UTILIZING WASTE HEAT IN ELECTRICAL POWER GENERATION

(71) Applicant: Sapphire Technologies, Inc., Cerritos, CA (US)

(72) Inventors: Jeremy Liu, Cerritos, CA (US); James Ryan Yates, Cerritos, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 17/658,370

(22) Filed: Apr. 7, 2022

(51) Int. Cl.
| F01K 27/02 | (2006.01) |
| F01K 7/16 | (2006.01) |
| F02C 7/00 | (2006.01) |
| F01C 1/00 | (2006.01) |

(52) U.S. Cl.
CPC ............ *F01K 27/02* (2013.01); *F01C 1/00* (2013.01); *F01K 7/16* (2013.01); *F02C 7/00* (2013.01)

(58) Field of Classification Search
CPC .... F01K 27/02; F01K 7/16; F01C 1/00; F02C 7/00
USPC ........................................ 60/650, 682–684
See application file for complete search history.

(56) References Cited

U.S. PATENT DOCUMENTS

| 3,508,090 A | 4/1970 | Crampton et al. |
| 5,689,175 A | 11/1997 | Hanson et al. |
| 7,638,892 B2 | 12/2009 | Myers |
| 8,146,360 B2 | 4/2012 | Myers et al. |
| 8,384,232 B2 | 2/2013 | Myers et al. |
| 8,400,005 B2 | 3/2013 | Huber et al. |
| 8,739,538 B2 | 6/2014 | Myers et al. |
| 8,839,622 B2 | 9/2014 | Myers et al. |
| 2009/0165461 A1* | 7/2009 | Klassen ................ F03G 6/00 60/645 |
| 2012/0013125 A1 | 1/2012 | Myers et al. |
| 2013/0286591 A1 | 10/2013 | Myers et al. |
| 2013/0300120 A1* | 11/2013 | Podrog ................ F01D 15/02 74/DIG. 9 |
| 2016/0338225 A1* | 11/2016 | Joshi ................ H05K 7/20936 |
| 2019/0055899 A1* | 2/2019 | Munevar ............ F02B 29/0443 |
| 2019/0153952 A1* | 5/2019 | Niergarth ................ F02C 7/14 |
| 2019/0366803 A1 | 12/2019 | Harris |
| 2021/0156308 A1 | 5/2021 | Jones |

* cited by examiner

*Primary Examiner* — Hoang M Nguyen
(74) *Attorney, Agent, or Firm* — Fish & Richardson P.C.

(57) ABSTRACT

A system includes an electric generator, a power electronics system, a first heat exchanger, and a second heat exchanger. The electric generator includes a turbine wheel, a rotor, and a stator. The turbine wheel is configured to receive process gas and rotate in response to expansion of the process gas flowing through the electric generator. The rotor is configured to rotate with the turbine wheel. The electric generator is configured to generate electrical power upon rotation of the rotor within the stator. The power electronics system is configured to receive the electrical power from the electric generator and convert the electrical power to specified power characteristics. A heat transfer fluid receives waste heat from the power electronics system through the first heat exchanger. The heat transfer fluid transfers the received waste heat to the process gas through the second heat exchanger.

20 Claims, 7 Drawing Sheets

CAPTURING AND UTILIZING WASTE HEAT IN ELECTRICAL POWER GENERATION

TECHNICAL FIELD

This disclosure relates to electrical power generation.

BACKGROUND

Natural gas is one of the principal sources of energy for many of our day-to-day needs and activities. Natural gas is an attractive fossil fuel for its abundance. Hydrogen is a rapidly expanding global energy storage market. Hydrogen is used in many manufacturing processes, from petroleum refining to food processing. Hydrogen is also used as a fuel source for gas turbines and in a broad range of fuel cells to generate electricity in industrial and consumer transportation sectors.

The efficient and effective movement of such gases from producing regions to consumption regions requires an extensive and elaborate transportation system. Gas that is transported through pipelines travels at high pressure in the pipeline.

SUMMARY

This disclosure describes technologies relating to electrical power generation using gas expansion work. Certain aspects of the subject matter described can be implemented as a system. The system includes an electric generator, a power electronics system, a first heat exchanger, a second heat exchanger, a conduit system, and a pump. The electric generator includes a turbine wheel, a rotor, and a stator. The turbine wheel is configured to receive process gas and rotate in response to expansion of the process gas flowing into an inlet of the turbine wheel and out of an outlet of the turbine wheel. The rotor is coupled to the turbine wheel. The rotor is configured to rotate with the turbine wheel. The electric generator is configured to generate electrical power upon rotation of the rotor within the stator. The power electronics system is electrically connected to an electrical output of the electric generator. The power electronics system is configured to receive the electrical power from the electric generator and convert the electrical power to specified power characteristics. The first heat exchanger is thermally coupled to the power electronics system. The second heat exchanger is in fluid communication with the process gas. The conduit system fluidically couples the first heat exchanger and the second heat exchanger. The pump is configured to circulate a heat transfer fluid through the conduit system. The heat transfer fluid receives waste heat from the power electronics system through the first heat exchanger. The heat transfer fluid transfers the received waste heat to the process gas through the second heat exchanger.

This, and other aspects, can include one or more of the following features. The electrical power can be a first alternating current. The power electronics system can include a power converter connected to the electrical output of the electric generator. The power converter can be configured to convert the first alternating current received from the electric generator into a second alternating current compatible with a power grid. The electric generator can include a three-phase permanent magnet synchronous generator. The second heat exchanger can be located on a pipeline flowing the process gas, upstream of the electric generator, such that the second heat exchanger transfers the received waste heat from the heat transfer fluid to the process gas prior to the process gas flowing into the inlet of the turbine wheel. The second heat exchanger can be located on a pipeline flowing the process gas, downstream of the electric generator, such that the second heat exchanger transfers the received waste heat from the heat transfer fluid to the process gas after the process gas flows out of the outlet of the turbine wheel. The second heat exchanger can be integrated with the electric generator, such that the second heat exchanger transfers the received waste heat from the heat transfer fluid to the process gas while the process gas flows through the electric generator. The power converter can include a rectifier that is configured to receive the first alternating current from the electric generator. The rectifier can be configured to convert the first alternating current into a direct current. The power converter can include an inverter that is configured to receive the direct current from the rectifier. The inverter can be configured to convert the direct current into the second alternating current that has an amplitude and frequency that are compatible with the power grid. The power converter can be a bidirectional power converter. The rectifier can be configured to receive a third alternating current from the power grid. The rectifier can be configured to convert the third alternating current into a second direct current. The inverter can be configured to receive the second direct current from the rectifier. The inverter can be configured to convert the second direct current into a fourth alternating current that has a second amplitude and a second frequency that are compatible with the electric generator to drive rotation of the rotor.

Certain aspects of the subject matter described can be implemented as a method. A process gas is flowed to a turbine wheel of an electric generator. Electrical power is generated by the electric generator in response to the process gas flowing across the turbine wheel. The electrical power generated by the electric generator is directed to a power electronics system. The electrical power is converted by the power electronics system to specified power characteristics. A heat transfer fluid is circulated through a conduit system that fluidically couples a first heat exchanger and a second heat exchanger. The first heat exchanger is thermally coupled to the power electronics system. The second heat exchanger is in fluid communication with the process gas. Circulating the heat transfer fluid through the conduit system includes directing the heat transfer fluid through the first heat exchanger to capture waste heat produced by the power electronics system. Circulating the heat transfer fluid through the conduit system includes directing the heat transfer fluid through the second heat exchanger to transfer the received waste heat to the process gas.

This, and other aspects, can include one or more of the following features. The electrical power generated by the electric generator can be directed to a power grid through the power electronics system. The second heat exchanger can be located on a pipeline flowing the process gas, upstream of the electric generator, such that the second heat exchanger transfers the received waste heat from the heat transfer fluid to the process gas prior to the process gas flowing into the inlet of the turbine wheel. The second heat exchanger can be located on a pipeline flowing the process gas, downstream of the electric generator, such that the second heat exchanger transfers the received waste heat from the heat transfer fluid to the process gas after the process gas flows out of the outlet of the turbine wheel. The second heat exchanger can be integrated with the electric generator, such that the second heat exchanger transfers the received waste heat from the heat transfer fluid to the process gas while the process gas flows through the electric generator. The electrical power generated by the electric generator can be a first alternating current. The power electronics system can include a power converter. The first alternating current generated by the electric generator can be converted into a second alternating current that is compatible with the power grid. The power converter can include a rectifier and an inverter. Converting the first alternating current into the second alternating current can include receiving, by the rectifier, the first alternating current generated by the electric generator. Converting the first alternating current into the second alternating current can include converting, by the rectifier, the first alternating current into a direct current. Converting the first alternating current into the second alternating current can include receiving, by the inverter, the direct current from the rectifier. Converting the first alternating current into the second alternating current can include converting, by the inverter, the direct current into the second alternating current having an amplitude and frequency that are compatible with the power grid. The power converter can be a bidirectional power converter. A third alternating current from the power grid can be received by the rectifier. The third alternating current can be converted by the rectifier into a second direct current. The second direct current from the rectifier can be received by the inverter. The second direct current can be converted by the inverter into a fourth alternating current that has a second amplitude and a second frequency that are compatible with the electric generator to drive rotation of the turbine wheel.

Certain aspects of the subject matter described can be implemented as an apparatus. The apparatus includes an electric generator, a power electronics system, a first heat exchanger, a second heat exchanger, a conduit system, and a pump. The electric generator includes a turbine wheel, a rotor, and a stator. The turbine wheel is configured to receive process gas and rotate in response to expansion of the process gas flowing into an inlet of the turbine wheel and out of an outlet of the turbine wheel. The rotor is coupled to the turbine wheel. The rotor is configured to rotate with the turbine wheel. The electric generator is configured to generate electrical power upon rotation of the rotor within the stator. The power electronics system is electrically connected to an electrical output of the electric generator. The power electronics system is configured to receive the electrical power from the electric generator and convert the electrical power to specified power characteristics. The first heat exchanger is thermally coupled to the power electronics system. The second heat exchanger is in fluid communication with the process gas. The second heat exchanger is integrated with and surrounds at least a portion of the electric generator. The conduit system fluidically couples the first heat exchanger and the second heat exchanger. The pump is configured to circulate a heat transfer fluid through the conduit system. The heat transfer fluid receives waste heat from the power electronics system through the first heat exchanger. The heat transfer fluid transfers the received waste heat to the process gas through the second heat exchanger while the process gas flows through the electric generator.

This, and other aspects, can include one or more of the following features. The electrical power can be a first alternating current. The power electronics system can include a power converter that is connected to the electrical output of the electric generator. The power converter can be configured to convert the first alternating current received from the electric generator into a second alternating current that is compatible with a power grid. The power converter can include a rectifier that is configured to receive the first alternating current from the electric generator. The rectifier can be configured to convert the alternating current into a direct current. The power converter can include an inverter that is configured to receive the direct current from the rectifier. The inverter can be configured to convert the direct current into the second alternating current having an amplitude and frequency that are compatible with the power grid. The electric generator can include a three-phase permanent magnet synchronous generator. The power converter can be a bidirectional power converter. The rectifier can be configured to receive a third alternating current from the power grid. The rectifier can be configured to convert the third alternating current into a second direct current. The inverter can be configured to receive the second direct current from the rectifier. The inverter can be configured to convert the second direct current into a fourth alternating current having a second amplitude and a second frequency that are compatible with the electric generator to drive rotation of the rotor.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city or district networks or on site industrial plants networks. To deliver the gas safely through local distribution networks and for use, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping. A turboexpander generator can be installed in parallel to the regulating valve to recover the wasted energy from pressure reduction and produce electrical power. The electrical power can be directed to a power grid or elsewhere. Along the same lines, a turboexpander generator can be installed at a gas storage facility upstream of one or more storage tanks to recover high pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

Figure 1:
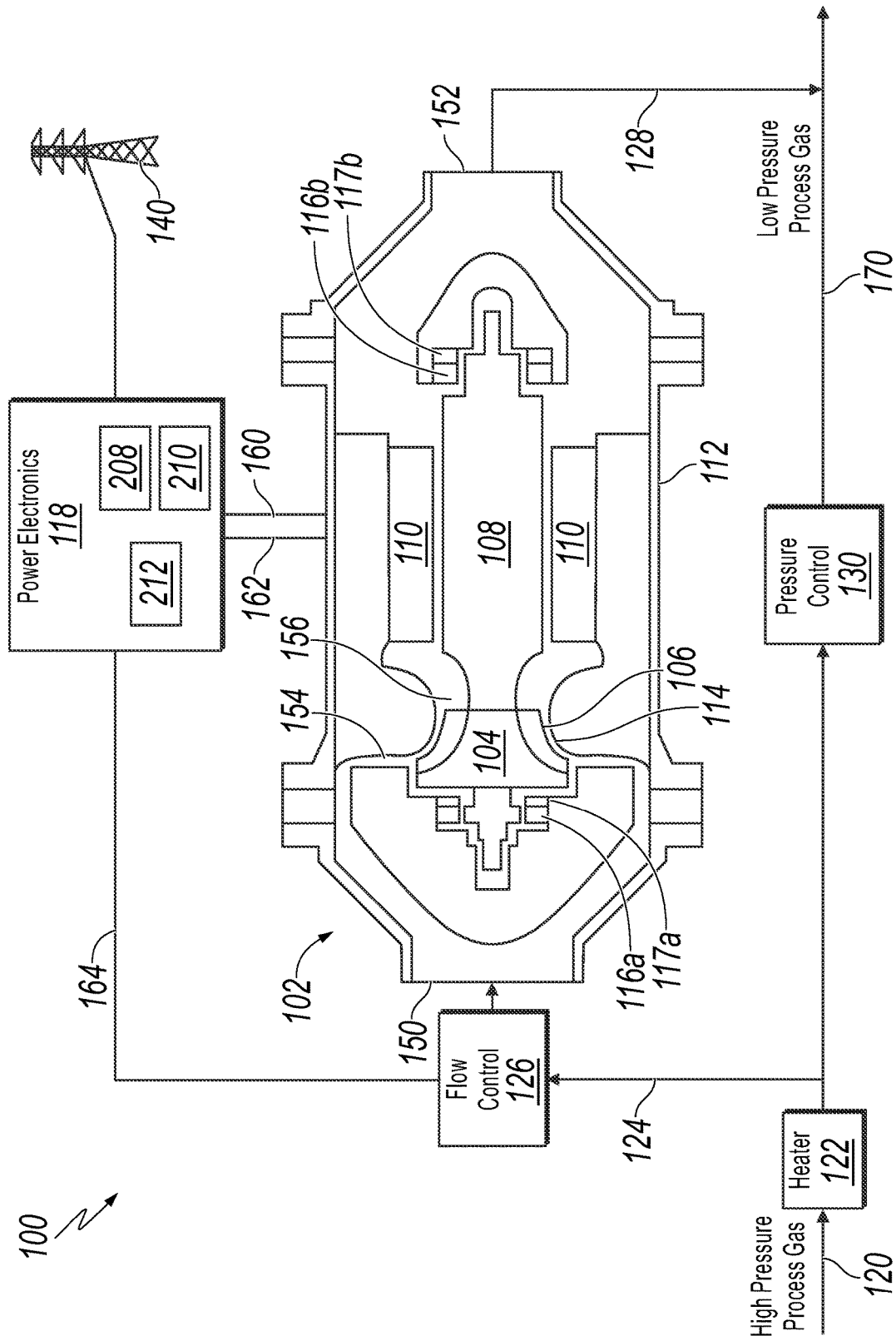
FIG. 1 is a schematic diagram of an example electrical power generation system coupled to a power grid.

FIG. 1 is a schematic diagram of an electrical power generation system 100 coupled to a power grid 140. The electrical power generation system 100 can be added at a PLD station to capture energy from gas expansion from the PLD process, or in any of the other applications described above. The electrical power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a process gas 120 through a turbine wheel 104. For example, rotation of the turbine wheel 104 can be used to rotate a rotor 108 within a stator 110, which then generates electrical power.

The turboexpander 102 includes a high-performance, high-speed permanent magnet generator with an integrated radial in-flow expansion turbine wheel 104 and low loss active magnetic bearings (AMBs) 116a,b. The rotor assembly consists of the permanent magnet section with the turbine wheel 104 mounted directly to the rotor hub. The rotor 108 is levitated by the magnetic bearing system creating a frictionless (or near frictionless) interface between dynamic and static components. The AMBs 116a,b facilitate a lossless (or near lossless) rotation of the rotor 108.

The turboexpander 102 is designed to have a process gas 120 flow through the system 100, which cools the generator and eliminates the need for auxiliary cooling equipment. The turboexpander electronics 118 for the turboexpander 102 combines a power converter 206 and Magnetic Bearing Controller (MBC) 212 into one cabinet, in some implementations. The power converter 206 allows for a consistent and clean delivery of generated power from the turboexpander 102 to a power grid 140. The power converter 206 regulates the frequency and amplitude of the generated current to match the local grid. After expansion, the process gas 120 exits the turboexpander 102 along the same axial path for downstream processes.

The turboexpander 102 includes a flow-through configuration. The flow-through configuration permits the process gas 120 to flow from an inlet side of the turboexpander 102 to an outlet side of the turboexpander 102. The process gas 120 flows into a radial gas inlet 154 to the turbine wheel 104 and out of the turbine wheel 104 from an axial gas outlet 156. The process gas 120 then flow through the generator and out of the outlet 154, where the process gas 120 rejoins the gas pipeline 170. Generally, high pressure process gas 120 is directed to flow into the turboexpander 102 through a flow control system 126. The flow control system 126 includes a flow or mass control valve and an emergency shut off valve. Flow control system 126 can be controlled by turboexpander electronics 118 or other electrical, mechanical, or electromagnetic signal. For example, a fault condition can signal the flow control system 126 to close or partially close, thereby removing or restricting gas supply to the turboexpander 102. Restricting or removing gas flow to the turboexpander slows the rotation of the turbine wheel and consequently, slows the rotor. In the example shown in FIG. 1, a signal channel 164 from the turboexpander electronics 118 can be used to open and/or close the flow control system 126. In some implementations, the turboexpander housing 112 is hermetically sealed.

The process gas 120 is expanded by flowing across the turbine wheel 104, resulting in a pressure letdown of the process gas 120. The process gas 120 exits the turboexpander 102 at a decreased pressure. The expansion of the process gas 120 across the turbine wheel 104 causes the turbine wheel 104 to rotate, which causes the rotor 108 to rotate. The rotation of the rotor 108 within the stator 110 generates electrical power. The turboexpander 102 achieves the desired pressure letdown and captures the energy from the pressure letdown to generate electrical power. A pressure control valve 130, such as a conventional pressure regulator, can be installed in parallel to the turboexpander 102. The pressure control valve 130 can be used to control the pressure of the process gas 120 that flows through the turboexpander. Any excess high pressure process gas 120 that is not directed into the turboexpander 102 can be directed through the pressure control valve 130.

In some implementations, a heater 122 can heat the process gas 120 prior to flowing the process gas 120 into the turboexpander 102. For example, if the expansion of the process gas 120 through the turbine wheel 104 lowers the temperature of the process gas 120 to a point where moisture in the process gas 120 freezes at the turbine wheel 104 or another downstream location, the process gas 120 can be heated by heater 122 prior to entering the turboexpander 102. After heating, the process gas 120 can then be directed into the turboexpander 102. The heating of the process gas 120 can prevent freezing moisture as the process gas 120 expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, the process gas 120 is received from an inlet conduit 150 of the housing 112 enters a radially oriented inlet 154 of the turbine wheel 104. In some implementations, the process gas 120 flows through an inlet conduit 150 and is diverted by a flow diverter to a radial inlet 154 that directs the fluid into the radial inflow of the turbine wheel 104. After expanding, the process gas 120 exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that interact with the expanding process gas 120 to cause the turbine wheel 104 to rotate. FIG. 1 shows an unshrouded turbine wheel 104, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas 120 therebetween, as the process gas 120 flows through the turbine wheel 104. Although some amount of the process gas 120 may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In some implementations, the housing 112 is hermetically sealed to prevent process gas 120 from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a cantilevered manner by the bearings 116a and 116b. In some implementations, the turbine wheel 104 may be supported in a non-cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In implementations in which the bearings 116a and 116b are magnetic bearings, a magnetic bearing controller (MBC) 212 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 212 may receive information from the position sensor(s) 117a, 117b and process that information to provide control signals to the magnetic bearings 116a, 116b. MBC 212 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as eliminate lubrication, lubrication systems, and seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings and may include ball bearings, needle bearings, journal bearings, or the like.

As mentioned previously, the turboexpander 102 is configured to generate electrical power in response to the rotation of the rotor 108. In certain instances, the rotor 108 can include one or more permanent magnets. The stator 110 includes a plurality of conductive coils. Electrical power is generated by the rotation of the magnet within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator 110. At any instant, the magnitude of the voltage induced in stator coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electrical power at that speed. Such a turboexpander 102 is what is referred to as a "high speed" turbine generator. For example, the turboexpander 102 can produce up to 280 kW at a continuous speed of 30,000 rpm. In some implementations, the turboexpander produces on the order of 350 kW at higher rotational speeds (e.g., on the order of 35,000 rpm).

In some implementations, the design of the turbine wheel 104, rotor 108, and/or stator 110 can be based on a desired parameter of the output gas from the turboexpander 102. For example, the design of the rotor and stator can be based on a desired temperature and/or pressure of the process gas 120 exiting the turboexpander 102.

The turboexpander 102 can be coupled to turboexpander electronics 118. Turboexpander electronics 118 can include power electronics, such as a power converter 206, and/or the magnetic bearing controller (MBC) 212 (discussed above). In some instances, the turboexpander electronics 118 can include yet additional electronics. The power converter 206 can be, for example, a variable speed drive (VSD) or a variable frequency drive.

The electrical output 160 of the turboexpander 102 is connected to the power converter 206, which can be programmed to specific power requirements. In certain instances, the power converter 206 can include an insulated-gate bipolar transistor (IGBT) rectifier 208 to convert the variable frequency, high voltage output from the turboexpander 102 to a direct current (DC). In certain instances, the rectifier 208 can be a three-phase rectifier for three-phase AC input current. An inverter 210 then converts the DC from the rectifier 208 to AC for supplying to the power grid 140.

In certain instances, the inverter 210 can convert the DC to 380 VAC-480 VAC at 50 to 60 Hz for delivery to the power grid 140. The specific output of the power converter 206 depends on the power grid 140 and application. Other conversion values are within the scope of this disclosure. The power converter 206 matches its output to the power grid 140 by sampling the grid voltage and frequency, and then changing the output voltage and frequency of the inverter 210 to match the sampled power grid voltage and frequency.

In some implementations, the power converter 206 is a bidirectional power converter. In such implementations, the rectifier 208 can receive an alternating current from the power grid 140 and convert the alternating current into a direct current. The inverter 210 can then convert DC from the rectifier 208 to AC for supplying to the generator. In such implementations, power can be delivered from the power grid 140 to the generator to drive rotation of the rotor 108, and in turn, the turbine wheel 104 to induce flow of a process gas. In sum, in implementations in which the power converter 206 is a bidirectional power converter, the flow of power can be reversed and used by the generator to induce flow of a process gas (as opposed to the process gas contributing expansion work to generate power). The power grid 140 that the turboexpander 102 can supply power to (and/or draw power from) can be a national or regional power grid, a local power grid for a city or district, or a small grid, local grid, or microgrid, such as an on-site grid that supplies power to a building, campus, industrial manufacturing or processing plant, or neighborhood.

The turboexpander 102 is also connected to the MBC 212 in the turboexpander electronics 118. The MBC 212 constantly monitors position, current, temperature, and other parameters to control the turboexpander 102 and the active magnetic bearings 116a and 116b. For example, the MBC 212 is coupled to position sensors 117a, 117b to monitor and control radial and axial position of the turbine wheel 104 and the rotor 108. The MBC 212 can control the magnetic bearings 116a, 116b to selectively change the stiffness and damping characteristics of the magnetic bearings 116a, 116b as a function of spin speed. The MBC 212 can also control synchronous cancellation, including automatic balancing control, adaptive vibration control, adaptive vibration rejection, and unbalance force rejection control.

Figure 2A:
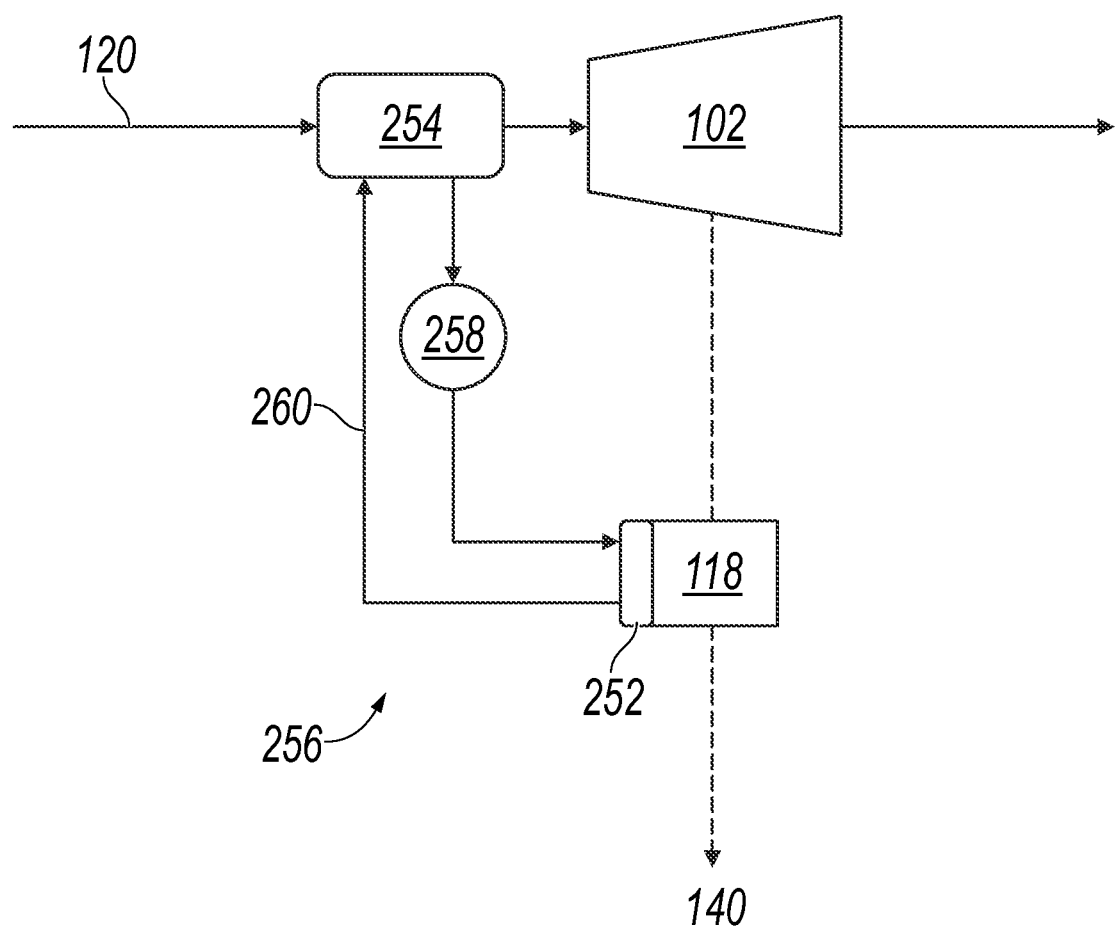
FIG. 2A is a schematic diagram of an example turboexpander system that includes a waste heat capture system.

FIG. 2A is a schematic diagram of an example turboexpander system 200A that includes a waste heat capture system 250. Turboexpander system 200A includes the turboexpander 102 and the turboexpander electronics 118 of system 100 (described previously and shown in FIG. 1). The turboexpander 102 receives a high pressure process gas 120. The process gas 120 is any pressurized gas that needs to be stepped down in pressure prior to use. For example, the process gas 120 is a gas that has been pressurized for transport, and once the process gas 120 has been transported to a specified location, the process gas 120 is stepped down in pressure by the turboexpander 102. The process gas 120 can be, for example, natural gas, hydrogen gas, or nitrogen gas. The process gas 120 expands as it flows through the turboexpander 102, which causes the turbine wheel 104 to rotate. The rotation of the turbine wheel 104 rotates the rotor 108 that supports a plurality of permanent magnets. The rotation of the permanent magnets on the rotor 108 induces a current through coils or windings on stator 110 to produce electrical power. The power electronics of the turboexpander electronics 118 allows for a consistent and clean delivery of generated power from the turboexpander 102 to a power grid 140.

During operation, the turboexpander electronics 118 can generate waste heat. Waste heat typically dissipates to a surrounding environment. The system 200A includes the waste heat capture system 250, which can capture and utilize this waste heat. The waste heat capture system 250 includes a first heat exchanger 252, a second heat exchanger 254, a conduit system 256, and a pump 258. The first heat exchanger 252 can be one or more heat exchangers thermally coupled to the turboexpander electronics 118. For example, one or more components of the turboexpander electronics 118 (for example, the inverter 210, potted inductor coils of the VSD (power converter 206), and/or key electronic components, such as insulated gate bipolar transistors) can be mounted on one or more cold plates which are metallic and include internal fluid cooling channels. The first heat exchanger 252 can be the one or more cold plates that include internal fluid cooling channels for receiving waste heat from the one or more components of the turboexpander electronics 118. The second heat exchanger 254 is in heat transfer communication with the process gas 120. The conduit system 256 fluidically couples the first heat exchanger 252 and the second heat exchanger 254. The pump 258 is configured to circulate a heat transfer fluid 260 through the conduit system 256. The heat transfer fluid 260 is a fluid having suitable characteristics (for example, density, viscosity, thermal conductivity, and specific heat) at a range of temperatures for receiving waste heat from the turboexpander electronics 118 and transferring the received waste heat to the process gas 120. In some implementations, the heat transfer fluid 260 includes water, glycol (for example, propylene glycol, ethylene glycol, diethylene glycol, triethylene glycol, or polyethylene glycol), or a combination of these. As the heat transfer fluid 260 circulates through the conduit system 256, the heat transfer fluid 260 receives waste heat from the turboexpander electronics 118 through the first heat exchanger 252 and transfers the received waste heat to the process gas 120 through the second heat exchanger 254. Thus, the waste heat produced by the turboexpander electronics 118 is captured and used to heat the process gas 120. In this example, the second heat exchanger 254 is located upstream of the turboexpander 102. As such, the second heat exchanger 254 transfers the waste heat (received from the turboexpander electronics 118) from the heat transfer fluid 260 to the process gas 120 before the process gas 120 flows into the turboexpander 102. In some implementations, the second heat exchanger 254 is the heater 122 shown in FIG. 1. In some implementations, the second heat exchanger 254 is distinct from the heater 122 and works in conjunction with the heater 122 to pre-heat the process gas 120 before the process gas 120 enters the turboexpander 102. For example, the second heat exchanger 254 first pre-heats the process gas 120 using the waste heat received from the turboexpander electronics 118, and then the heater 122 further pre-heats the process gas 120 to a desired temperature before the process gas 120 enters the turboexpander 102. The first heat exchanger 252 can have any flow configuration, such as co-current flow, countercurrent flow, crossflow, or hybrid flow. Similarly, the second heat exchanger 254 can have any flow configuration, such as co-current flow, countercurrent flow, crossflow, or hybrid flow. In co-current flow (also referred to as parallel flow), the two streams flowing through the heat exchanger flow parallel to and in the same direction as each other. In countercurrent flow (also referred to as antiparallel), the two streams flowing through the heat exchanger flow parallel to and in opposite directions of each other. In crossflow, the two streams flowing through the heat exchanger flow perpendicularly to one another. In hybrid flow, the two streams flow through the heat exchanger in a manner that combines any characteristic(s) of co-current flow, countercurrent flow, and crossflow.

Figure 2B:
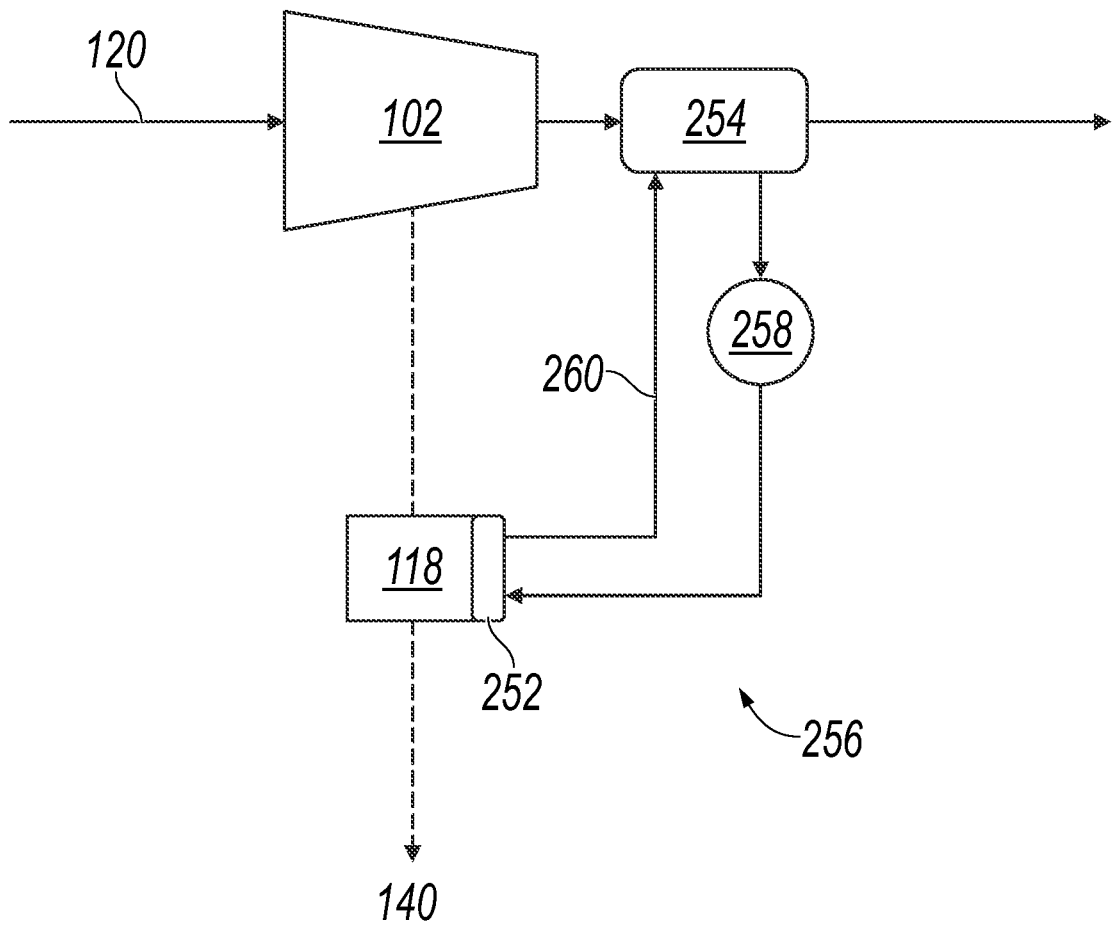
FIG. 2B is a schematic diagram of an example turboexpander system that includes a waste heat capture system.

The turboexpander system 200B shown in FIG. 2B is substantially similar to the turboexpander system 200A shown in FIG. 2A. In turboexpander system 200B, however, the second heat exchanger 254 is located downstream of the turboexpander 102. As such, the second heat exchanger 254 transfers the waste heat (received from the turboexpander electronics 118) from the heat transfer fluid 260 to the process gas 120 after the process gas 120 flows out of the turboexpander 102. Such implementations can be especially useful, for example, in fine-tuning the operating temperature of the process gas 120 before delivery to an end user. For example, a controller may control an operating point of the pump 258 (for example, speed) or flow control device (such as a control valve) to adjust the flow rate of the heat transfer fluid 260 flowing through the second heat exchanger 254 to meet a desired temperature setpoint based on a measured temperature input from a temperature sensor located downstream of the turboexpander 102 and upstream of the second heat exchanger 254.

Figure 2C:
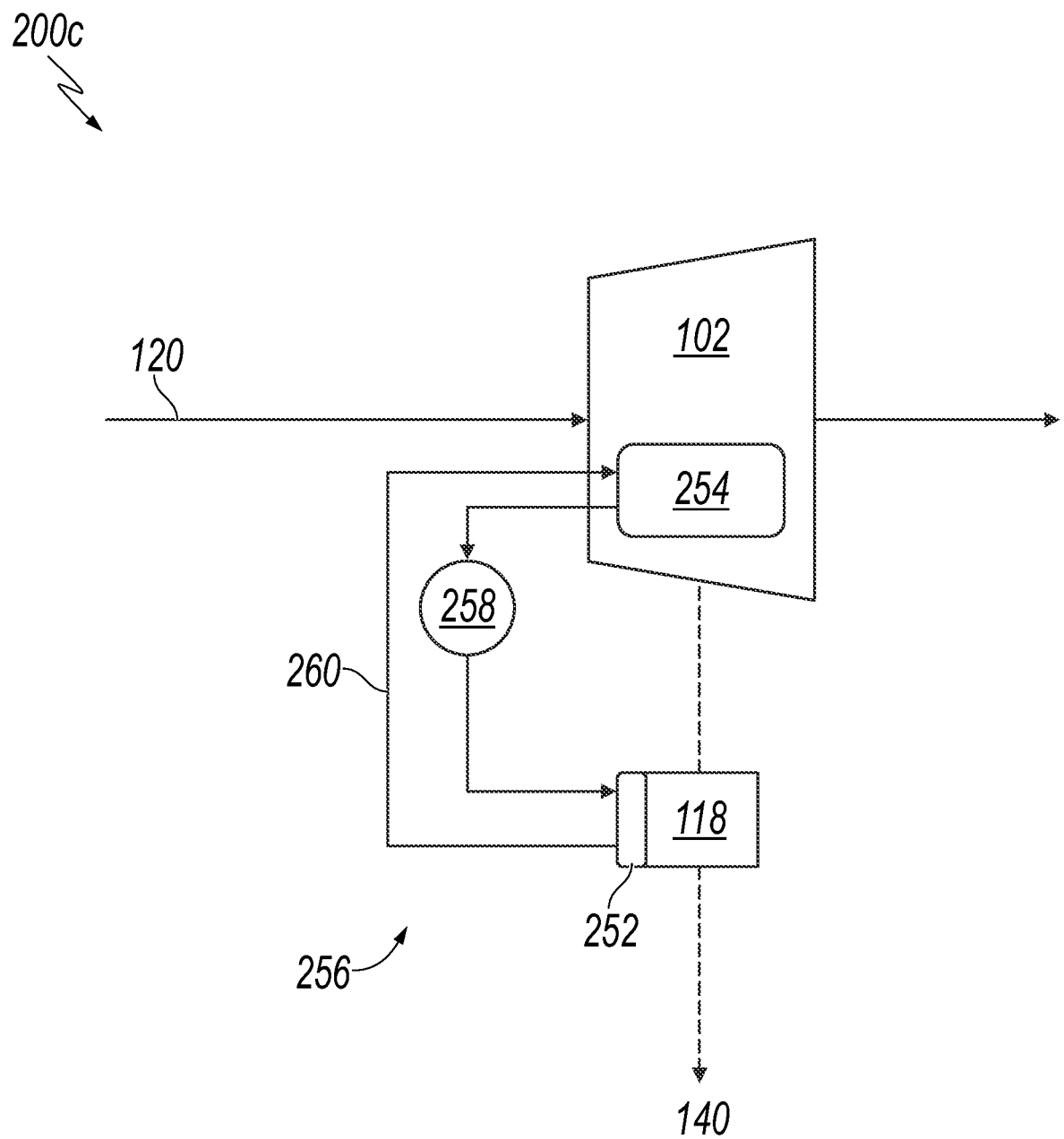
FIG. 2C is a schematic diagram of an example turboexpander system that includes a waste heat capture system.

The turboexpander system 200C shown in FIG. 2C is substantially similar to the turboexpander systems 200A and 200B shown in FIGS. 2A and 2B, respectively. In turboexpander system 200C, however, the second heat exchanger 254 is integrated with the turboexpander 102. As such, the second heat exchanger 254 transfers the waste heat (received from the turboexpander electronics 118) from the heat transfer fluid 260 to the process gas 120 while the process gas 120 flows through the turboexpander 102. In such implementations, the turboexpander 102 and the second heat exchanger 254 can be installed at once as a singular unit. Such implementations may, in some cases, be easier to install in comparison to systems 200A and 200B, in which the turboexpander 102 and the second heat exchanger 254 are separated and installed individually.

Figure 2D:
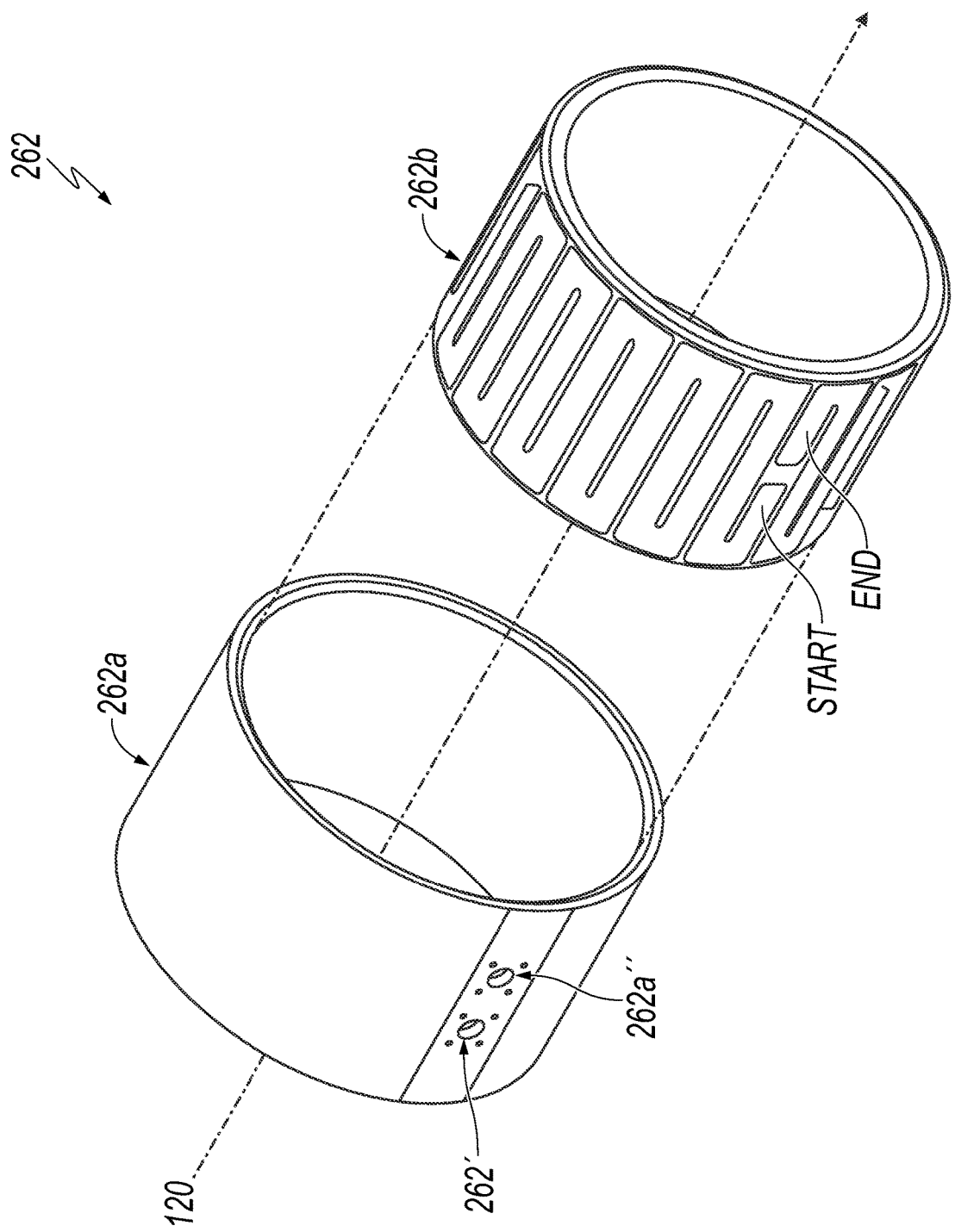
FIG. 2D is a schematic diagram of an example cooling jacket that can be included in a heat exchanger.

FIG. 2D depicts an example cooling jacket 262 that can be included in the second heat exchanger 254. The cooling jacket 262 includes an outer jacket 262a and an inner jacket 262b. The outer jacket 262a defines an inlet port 262a' for receiving the heat transfer fluid 260 and an outlet port 262a" for discharging the heat transfer fluid 260. The inner jacket 262b has a groove defining a pathway for the heat transfer fluid 260. The pathway begins at a starting point corresponding to the inlet port 262a' of the outer jacket 262a and ends at an ending point corresponding to the outlet port 262a" of the outer jacket 262a. The pathway can be, for example, a meandering pathway spanning an outer circumference of the inner jacket 262b. When the outer jacket 262a is coupled to the inner jacket 262b, the heat transfer fluid 260 can flow into the inlet port 262a', through the pathway defined by the groove of the inner jacket 262b, and out of the outlet port 262a". The process gas 120 can flow through an inner bore of the inner jacket 262b. As the heat transfer fluid 260 flows through the pathway defined by the groove of the inner jacket 262b, heat can be transferred from the heat transfer fluid 260 to the process gas 120 flowing through the inner bore of the inner jacket 262b. The second heat exchanger 254 including the cooling jacket 262 can be installed on a pipe that flows the process gas 120 upstream of the turboexpander 102 (example shown in FIG. 2A). The second heat exchanger 254 including the cooling jacket 262 can be installed on a pipe that flows the process gas 120 downstream of the turboexpander 102 (example shown in FIG. 2B).

Figure 2E:
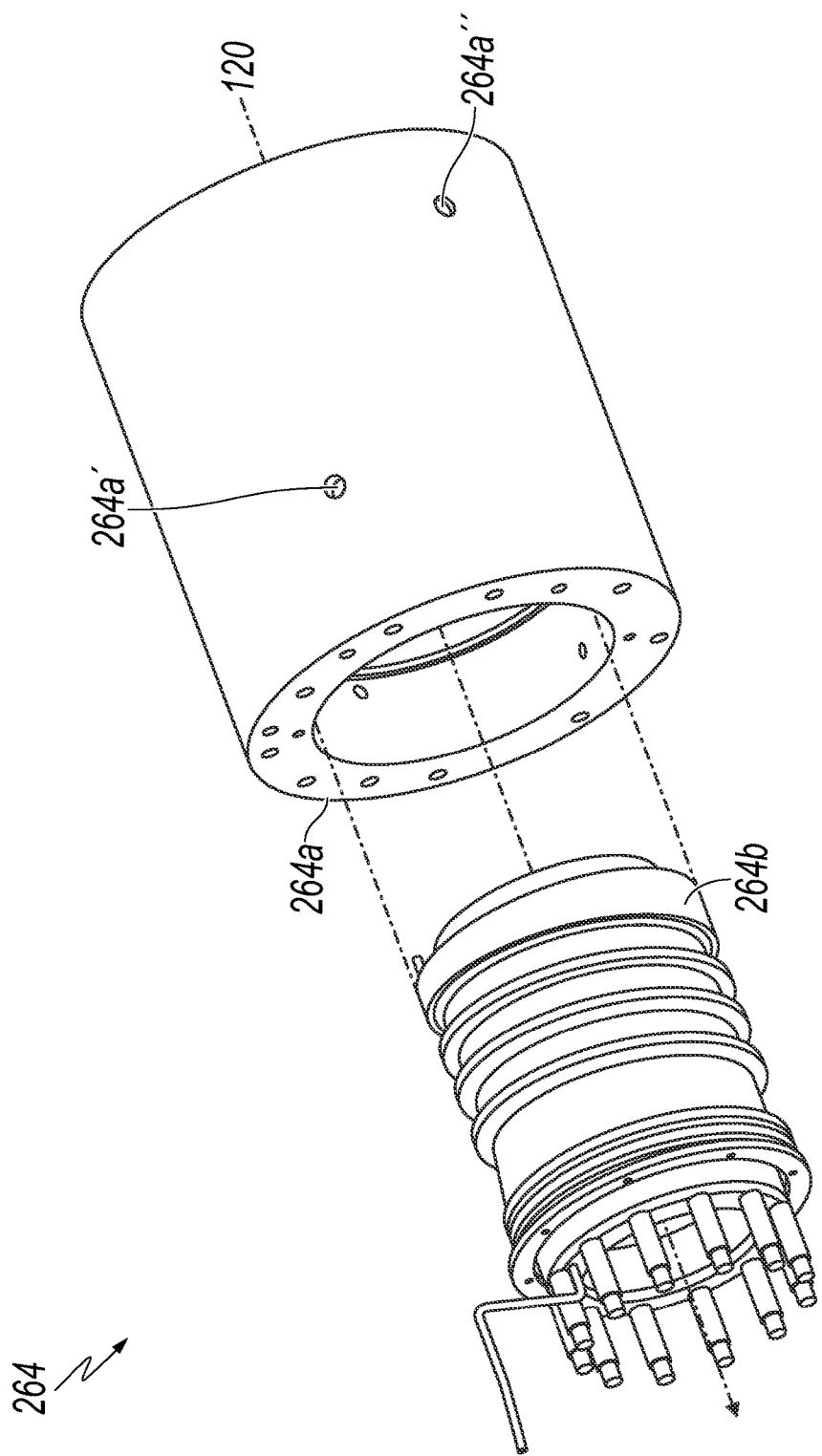
FIG. 2E is a schematic diagram of an example cooling jacket that can be included in a heat exchanger.

FIG. 2E depicts an example cooling jacket 264 that can be included in the second heat exchanger 254. The cooling jacket 264 includes an outer jacket 264a and an inner jacket 264b. The outer jacket 264a defines an inlet port 264a' for receiving the heat transfer fluid 260 and an outlet port 264a" for discharging the heat transfer fluid 260. The inner jacket 264b has a groove defining a pathway for the heat transfer fluid 260. The pathway begins at a starting point corresponding to the inlet port 264a' of the outer jacket 264a and ends at an ending point corresponding to the outlet port 264a" of the outer jacket 264a. The pathway can be, for example, a spiral pathway wrapping around the inner jacket 264b. When the outer jacket 264a is coupled to the inner jacket 264b, the heat transfer fluid 260 can flow into the inlet port 264a', through the pathway defined by the groove of the inner jacket 264b, and out of the outlet port 264a". The process gas 120 can flow through an inner bore of the inner jacket 264b. As the heat transfer fluid 260 flows through the pathway defined by the groove of the inner jacket 264b, heat can be transferred from the heat transfer fluid 260 to the process gas 120 flowing through the inner bore of the inner jacket 264b. The second heat exchanger 254 including the cooling jacket 264 can be integrated with the turboexpander 102 (example shown in FIG. 2C).

Figure 3:
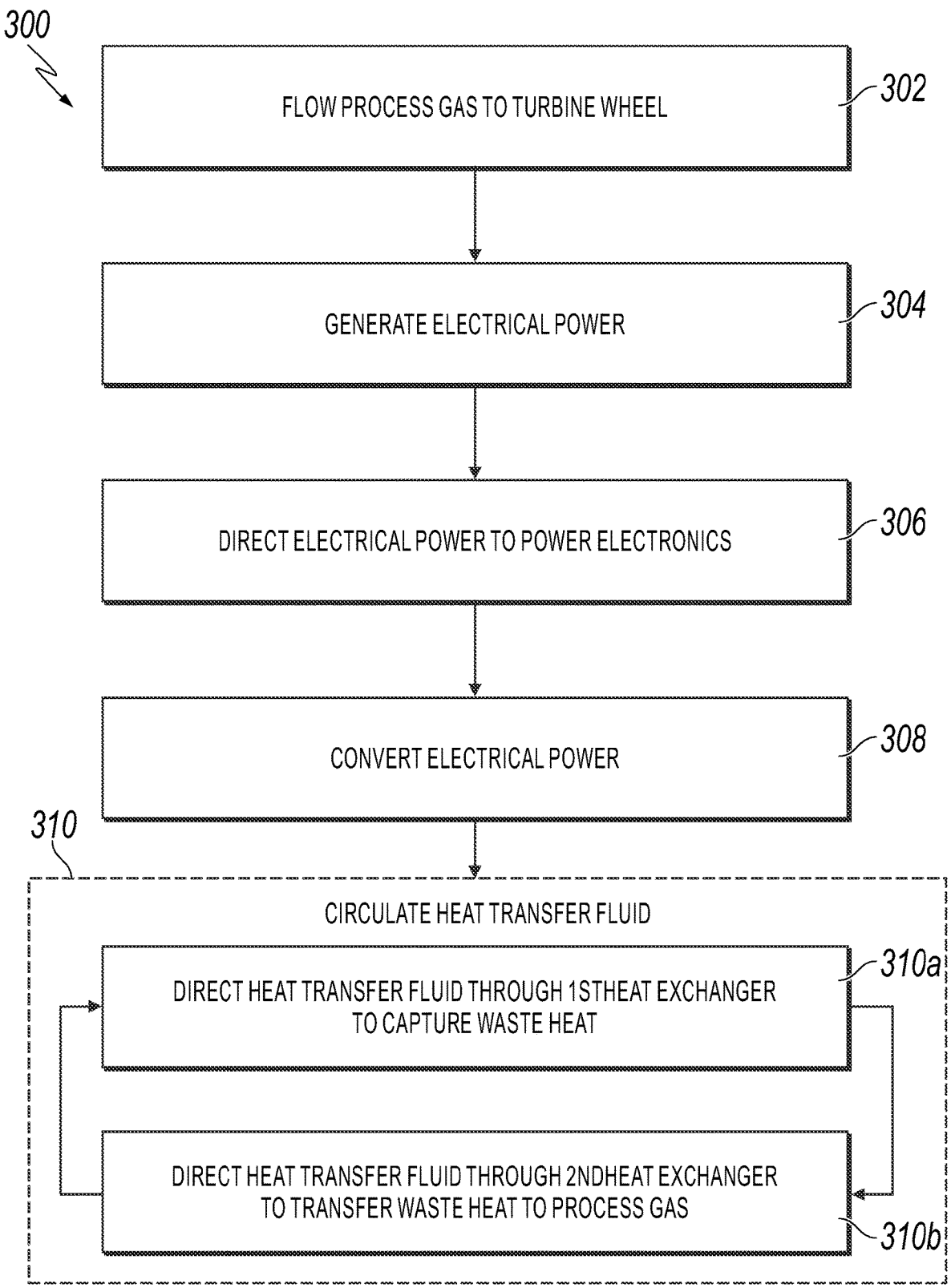
FIG. 3 is a flow chart of an example method for generating electrical power.

FIG. 3 is a flow chart of an example method 300 for generating electrical power using gas expansion work. The method 300 can be implemented, for example, by an implementation of the turboexpander system 200A, 200B, or 200C. At block 302, a process gas (such as the process gas 120) is flowed to a turbine wheel (such as the turbine wheel 104) of an electric generator (such as the turboexpander 102). At block 304, electrical power is generated by the turboexpander 102 in response to the process gas 120 flowing across the turbine wheel 104. At block 306, the electrical power (generated by the turboexpander 102 at block 304) is directed to a power electronics system (such as the turboexpander electronics 118). At block 308, the electrical power is converted by the turboexpander electronics 118 to specified power characteristics (for example, to be compatible with the power grid 140). At block 310, a heat transfer fluid (such as the heat transfer fluid 260) is circulated through a conduit system (such as the conduit system 256). As described previously, the conduit system 256 fluidically couples the first heat exchanger 252 and the second heat exchanger 254. The first heat exchanger 252 is thermally coupled to the turboexpander electronics 118, and the second heat exchanger 254 is in fluid communication with the process gas 120. The heat transfer fluid 260 can be circulated through the conduit system 256 at block 310, for example, by the pump 258. Circulating the heat transfer fluid 260 through the conduit system 256 at block 310 includes circulating sub-blocks 310a and 310b. At sub-block 310a, the heat transfer fluid 260 is directed through the first heat exchanger 252 to capture waste heat produced by the turboexpander electronics 118. At sub-block 310b, the heat transfer fluid 260 is directed through the second heat exchanger 254 to transfer the waste heat (received from the turboexpander electronics 118 at sub-block 310a) to the process gas 120.

The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation. In the foregoing specification, a detailed description has been given with reference to specific exemplary implementations. It will, however, be evident that various modifications and changes may be made thereto without departing from the broader spirit and scope of the disclosure as set forth in the claims.

What is claimed is:

1. A system comprising:
an electric generator comprising:
a turbine wheel configured to receive process gas from a pipeline and rotate in response to expansion of the process gas flowing into an inlet of the turbine wheel and out of an outlet of the turbine wheel;
a rotor coupled to the turbine wheel and configured to rotate with the turbine wheel;
a stator, wherein the electric generator is configured to generate electrical power upon rotation of the rotor within the stator; and
a flow-through housing encasing the turbine wheel, the rotor, and the stator, wherein the flow-through housing is hermetically sealed to the pipeline and configured to direct the process gas to the inlet of the turbine wheel;
a power electronics system electrically connected to an electrical output of the electric generator and configured to receive the electrical power from the electric generator and convert the electrical power to specified power characteristics;
a first heat exchanger thermally coupled to the power electronics system;
a second heat exchanger in fluid communication with the process gas;
a conduit system fluidically coupling the first heat exchanger and the second heat exchanger; and
a pump configured to circulate a heat transfer fluid through the conduit system, wherein the heat transfer fluid receives waste heat from the power electronics system through the first heat exchanger and transfers the received waste heat to the process gas through the second heat exchanger.

2. The system of claim 1, wherein the electrical power is a first alternating current, and the power electronics system comprises a power converter connected to the electrical output of the electric generator, the power converter configured to convert the first alternating current received from the electric generator into a second alternating current compatible with a power grid.

3. The system of claim 2, wherein the electric generator comprises a three-phase permanent magnet synchronous generator.

4. The system of claim 2, wherein the second heat exchanger is located on a pipeline flowing the process gas, upstream of the electric generator, such that the second heat exchanger transfers the received waste heat from the heat transfer fluid to the process gas prior to the process gas flowing into the inlet of the turbine wheel.

5. The system of claim 2, wherein the second heat exchanger is located on a pipeline flowing the process gas, downstream of the electric generator, such that the second heat exchanger transfers the received waste heat from the heat transfer fluid to the process gas after the process gas flows out of the outlet of the turbine wheel.

6. The system of claim 2, wherein the second heat exchanger is integrated with the electric generator, such that the second heat exchanger transfers the received waste heat from the heat transfer fluid to the process gas while the process gas flows through the electric generator.

7. The system of claim 2, wherein the power converter comprises:
a rectifier configured to receive the first alternating current from the electric generator and convert the first alternating current into a direct current; and
an inverter configured to receive the direct current from the rectifier and convert the direct current into the second alternating current comprising an amplitude and frequency compatible with the power grid.

8. The system of claim 7, wherein:
the power converter is a bidirectional power converter;
the rectifier is configured to receive a third alternating current from the power grid and convert the third alternating current into a second direct current; and
the inverter is configured to receive the second direct current from the rectifier and convert the second direct current into a fourth alternating current comprising a second amplitude and second frequency compatible with the electric generator to drive rotation of the rotor.

9. A method comprising:
flowing a process gas from a pipeline to a turbine wheel of an electric generator, wherein the turbine wheel is encased by a flow-through housing that is hermetically sealed to the pipeline and configured to direct the process gas to an inlet of the turbine wheel;
generating electrical power by the electric generator in response to the process gas flowing across the turbine wheel;
rejoining the process gas exiting the turbine wheel to the pipeline;
directing the electrical power generated by the electric generator to a power electronics system;
converting the electrical power by the power electronics system to specified power characteristics; and
circulating a heat transfer fluid through a conduit system fluidically coupling a first heat exchanger and a second heat exchanger, wherein the first heat exchanger is thermally coupled to the power electronics system, the second heat exchanger is in fluid communication with the process gas, and circulating the heat transfer fluid through the conduit system comprises:
directing the heat transfer fluid through the first heat exchanger to capture waste heat produced by the power electronics system; and
directing the heat transfer fluid through the second heat exchanger to transfer the received waste heat to the process gas.

10. The method of claim 9, comprising directing the electrical power generated by the electric generator to a power grid through the power electronics system.

11. The method of claim 10, wherein the second heat exchanger is located on a pipeline flowing the process gas, upstream of the electric generator, such that the second heat exchanger transfers the received waste heat from the heat transfer fluid to the process gas prior to the process gas flowing across the turbine wheel.

12. The method of claim 10, wherein the second heat exchanger is located on a pipeline flowing the process gas, downstream of the electric generator, such that the second heat exchanger transfers the received waste heat from the heat transfer fluid to the process gas after the process gas flows across the turbine wheel.

13. The method of claim 10, wherein the second heat exchanger is integrated with the electric generator, such that the second heat exchanger transfers the received waste heat from the heat transfer fluid to the process gas while the process gas flows across the turbine wheel.

14. The method of claim 10, wherein:
the electrical power generated by the electric generator is a first alternating current;
the power electronics system comprises a power converter; and
the method comprises converting the first alternating current generated by the electric generator into a second alternating current that is compatible with the power grid.

15. The method of claim 14, wherein the power converter comprises a rectifier and an inverter, and converting the first alternating current into the second alternating current comprises:
receiving, by the rectifier, the first alternating current generated by the electric generator;
converting, by the rectifier, the first alternating current into a direct current;
receiving, by the inverter, the direct current from the rectifier; and
converting, by the inverter, the direct current into the second alternating current comprising an amplitude and frequency that are compatible with the power grid.

16. The method of claim 15, wherein the power converter is a bidirectional power converter, and the method comprises:
receiving, by the rectifier, a third alternating current from the power grid;
converting, by the rectifier, the third alternating current into a second direct current;
receiving, by the inverter, the second direct current from the rectifier; and
converting, by the inverter, the second direct current into a fourth alternating current comprising a second amplitude and second frequency compatible with the electric generator to drive rotation of the turbine wheel.

17. An apparatus comprising:
an electric generator comprising:
a turbine wheel configured to receive process gas from a pipeline and rotate in response to expansion of the process gas flowing into an inlet of the turbine wheel and out of an outlet of the turbine wheel;
a rotor coupled to the turbine wheel and configured to rotate with the turbine wheel;
a stator, wherein the electric generator is configured to generate electrical power upon rotation of the rotor within the stator; and
a flow-through housing encasing the turbine wheel, the rotor, and the stator, wherein the flow-through housing is hermetically sealed to the pipeline and configured to direct the process gas to the inlet of the turbine wheel;
a power electronics system electrically connected to an electrical output of the electric generator and configured to receive the electrical power from the electric generator and convert the electrical power to specified power characteristics;
a first heat exchanger thermally coupled to the power electronics system;
a second heat exchanger in fluid communication with the process gas, the second heat exchanger integrated with and surrounding at least a portion of the electric generator;
a conduit system fluidically coupling the first heat exchanger and the second heat exchanger; and
a pump configured to circulate a heat transfer fluid through the conduit system, wherein the heat transfer fluid receives waste heat from the power electronics system through the first heat exchanger, and the heat transfer fluid transfers the received waste heat to the process gas through the second heat exchanger while the process gas flows through the electric generator.

18. The apparatus of claim 17, wherein the electrical power is a first alternating current, the power electronics system comprises a power converter connected to the electrical output of the electric generator, and the power converter is configured to convert the first alternating current received from the electric generator into a second alternating current compatible with a power grid.

19. The apparatus of claim 18, wherein the power converter comprises:
a rectifier configured to receive the first alternating current from the electric generator and convert the alternating current into a direct current; and
an inverter configured to receive the direct current from the rectifier and convert the direct current into the second alternating current comprising an amplitude and frequency compatible with the power grid.

20. The apparatus of claim 19, wherein:
the electric generator comprises a three-phase permanent magnet synchronous generator;
the power converter is a bidirectional power converter;
the rectifier is configured to receive a third alternating current from the power grid and convert the third alternating current into a second direct current; and
the inverter is configured to receive the second direct current from the rectifier and convert the second direct current into a fourth alternating current comprising a second amplitude and second frequency compatible with the electric generator to drive rotation of the rotor.

* * * * *